Sept. 3, 1935.  W. W. PARKER  2,013,501
ICE CREAM APPARATUS
Filed June 15, 1931  2 Sheets-Sheet 2
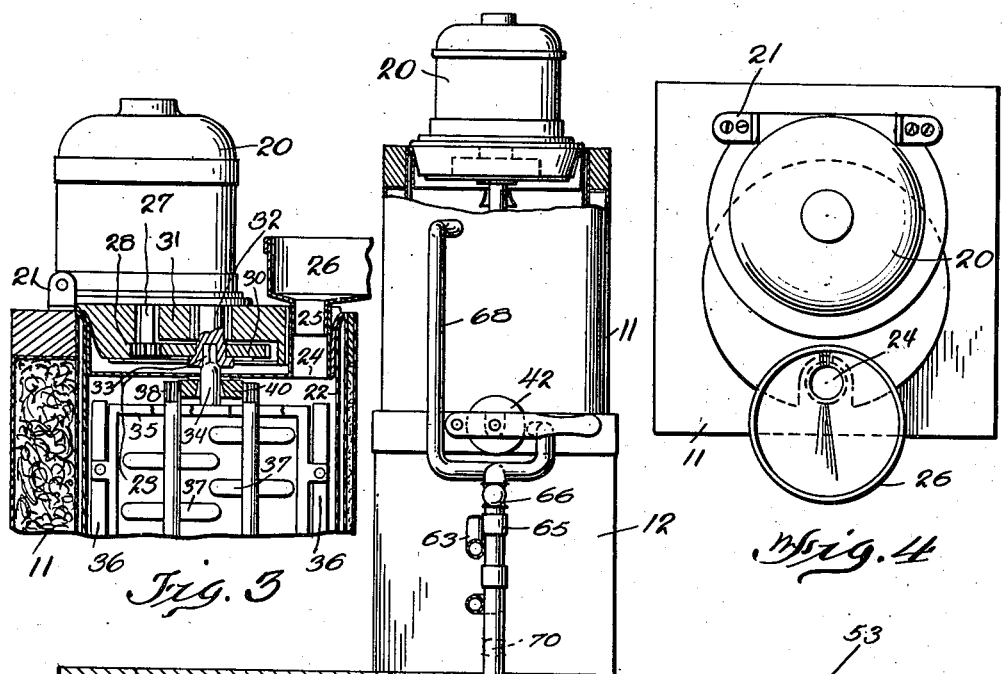
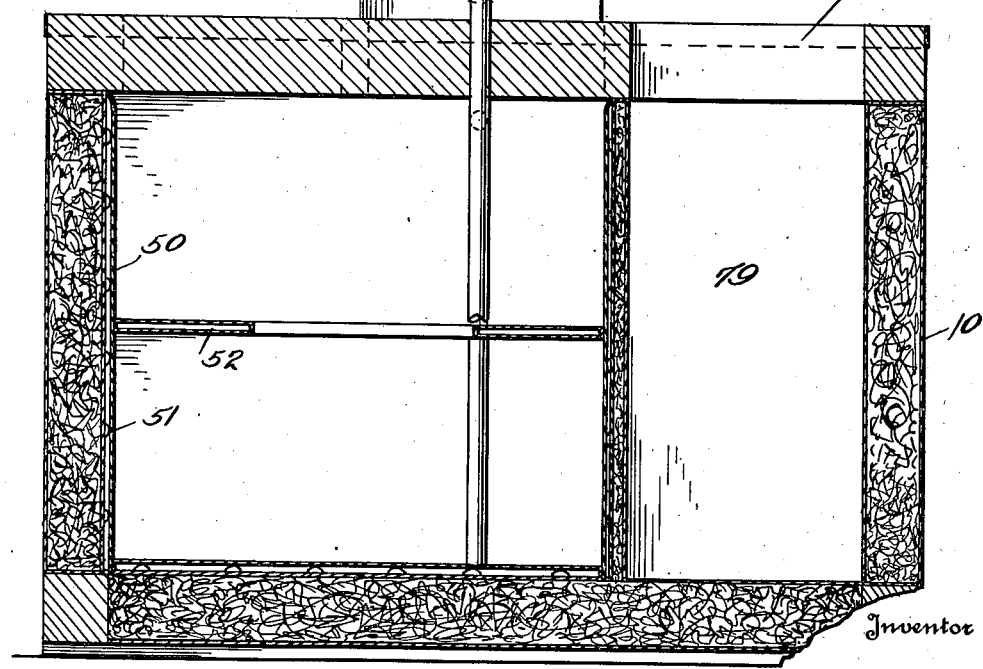

Patented Sept. 3, 1935

2,013,501

UNITED STATES PATENT OFFICE 2,013,501

ICE CREAM APPARATUS

William W. Parker, Raleigh, N. C.

Application June 15, 1931, Serial No. 544,565

4 Claims. (Cl. 62—114)

This invention relates to ice cream apparatus and more particularly to a self-contained unit or system especially adapted to the making of ice cream commercially in hotels, restaurants, soda counters, and the like.

One of the objects of the present invention is to provide a simple and practical apparatus of the above general character, of simplified, compact construction, which may be manufactured, assembled and operated at a relatively low cost.

Another object of the invention is to provide an apparatus of the above general character having a freezing unit and a storage unit which may be independently or simultaneously operated, according to circumstances, with a minimum amount of temperature fluctuation in the storage unit.

A further object is to provide an apparatus which may be kept in working and sanitary condition with the least amount of trouble.

A further object is to provide a system of the above character in which the various units entering into the system may be very compactly arranged and conveniently disposed each to the other.

A further object is to provide a system or apparatus with various appliances and attachments, thereby to increase the efficiency and safety of operation.

A further object is to provide such a system with improved refrigerating or cooling features.

Other objects will be in part obvious from the annexed drawings and in part hereinafter indicated in connection therewith by the following analysis of this invention.

This invention accordingly consists in the features of construction, the combination of parts, the unique relation of the members, and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting a preferred form of the invention have been annexed as part of this disclosure, and in such drawings like characters of reference denote corresponding parts throughout all of the views, in which—

Fig. 2 is a similar vertical sectional view taken substantially at right angles to Fig. 1.

Fig. 3 is a detail sectional view of the freezer unit and associated parts.

Fig. 4 is a detail plan view of the freezer unit.

Figure 1:
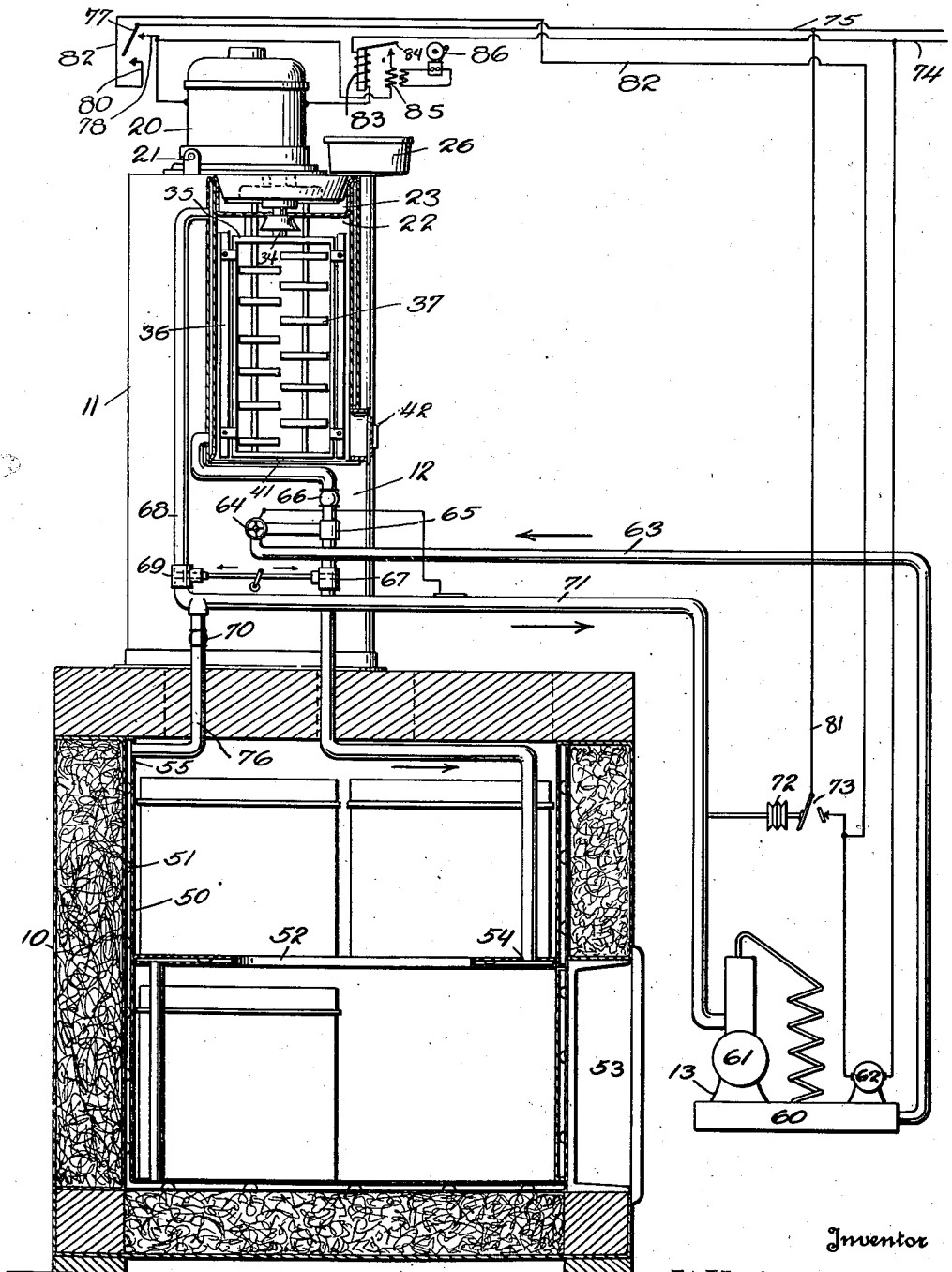
Fig. 1 is an elevational view, largely in section and partially diagrammatic, showing the complete apparatus and associated wiring diagrams.

In order that a clearer perception of the present invention may be had, as well as the objects and advantages sought to be accomplished, it may be stated that the invention is directed primarily to the making of ice cream on a small commercial scale, as above stated. The system comprehends preferably the use of a liquified gas such as sulphur dioxide or other common gaseous refrigerants, which refrigerant is allowed to flow from a suitable container through or within closed limits to and around the freezing unit and the storage or hardening unit and from whence the expanded gas is withdrawn by a suitable compressor pump, re-condensed, and returned to its container. When the actual freezer unit is not in use, then the refrigerant gas is by-passed in any desired manner.

At this point it is to be noted that the present apparatus is designed primarily for use with a refrigerant gas as distinguished from brine, because of its increased efficiency and economic advantages. However, certain of the mechanical features hereinafter claimed are equally applicable to a brine using system.

Referring to the drawings in detail, particularly Fig. 1, 10 indicates what will be termed the storage and hardening unit and preferably comprises, for example, a rectangular cabinet made of suitable material and provided with insulated walls in the customary manner. This cabinet or storage chamber may take the place of an ordinary counter at a soda fountain.

Above the cabinet is positioned the freezing unit indicated broadly at 11, Fig. 1, and this, as herein shown, rests upon a suitable open-faced chamber 12, which will be referred to as the control chamber. The actual refrigerant container and condensing means preferably comprise a separate unit 13 and may be installed at any convenient place such, for example, as in the basement of the building in which the apparatus is used.

With this broad understanding of the present invention in mind, let us first refer to the freezer unit 11 shown particularly at the upper part of Fig. 1 and in Fig. 3. This unit comprises a motor 20 of any desired size and shape according to circumstances and the amount of work required. It is preferably hinged at 21 (Fig. 3) at one side of the receptacle or frame 11 whereby it may be swung upwardly and rearwardly with respect to the freezer chamber 22. This chamber is preferably cylindrical in shape and rigidly mounted within the frame 11 and comprises a cylinder open at its upper end and adapted to be closed first by a cylindrical or drum-like member 23 which is provided with an opening 24 recessed in the motor frame and adapted to receive the spout 25 from a funnel 26. This permits the convenient filling of the freezer chamber 22 without disturbing the other parts of the mechanism.

Mounted directly upon the underside of the motor is a system of gears and their supports which, in the present instance, includes a shaft 27 directly connected with the armature of the motor and provided at its free end with a small spur gear 28. This in turn meshes with a materially larger gear 30 mounted and supported in suitable bearings and adapted to be driven at reduced speed by the motor. The bearing for this gear 30, as indicated at 31, is preferably an integral part of the motor frame, thereby to permit ease of assembly and economy in manufacture.

The central part of the gear 30 is provided with a shaft 32 having a squared recess 33 adapted to receive a similarly shaped stub shaft 34 projecting through the closure cover 23. This shaft 34 is either an integral part of or rigidly secured to a rectangular frame 35 carrying scrapers 36 at each side, the entire frame and scrapers being substantially coextensive with the vertical cross sectional area of the freezer 22. Mounted in this frame 35 are two parallel disposed beaters 37, each provided at their upper ends with small gears 38 adapted to mesh with a gear 40 rigidly secured to the cover plate 23.

It will thus be seen that as the motor rotates the gear 30, the frame 35 will in turn be rotated therewith and the gears 38 associated with this frame will have a planetary action with respect to the fixed gear 40, thereby thoroughly mixing and agitating the mix within the freezer 22. The lower end of the frame 35 is mounted in a suitable bearing 41 of slip joint construction whereby, when the motor is swung rearwardly carrying with it the gears 28 and 30, the closure drum 23 may be removed and the frame 35, and its agitators and scrapers, lifted out for cleaning purposes.

As will be apparent to those familiar with the art, the chilled mix in operation is poured in through the top as by means of the funnel 26 as herein indicated, and after the cream has reached the desired consistency, it is drawn off at the bottom as by means of the gate 42 into cans or other containers which are then transferred to the hardening or storage chamber.

The actual freezing of the mix within the freezing chamber 22 will be hereinafter described with relation to the system. It is sufficient at this point to state that the walls of the freezer 22 are preferably constructed of two interfitting cylinders, for example, welded together at their respective ends, thus forming a relatively thin chamber into which the liquefied gas is adapted to flow, thereby to absorb the heat from the mix. The outer cylinder wall is of course suitably insulated from the surrounding atmosphere as desired.

Referring now to Fig. 2, the storage chamber 10 for pre-chilling and hardening the cream is immediately below the freezer. This comprises a rectangular box or casing constructed in approved manner and of suitable materials, substantially the entire inner part of the hardening chamber being lined with evaporator walls 50, each part or side of which is preferably formed of two closely adjacent parallel plates spot-welded or otherwise secured at various points, as indicated at 51, thereby to resist the pressure of the gas. This storage chamber is provided with one or more shelves 52, each of which is preferably constructed of the same material and in a similar manner for passage of the freezing gas. The chamber is closed by one or more suitable doors 53 to permit access to the interior. These doors or openings may be arranged as desired; for instance a door at the side might permit access to a storage compartment while a second door at the top allows access to the containers from which service is being made. The hollow walls of this chamber are provided with a communicating inlet 54 and outlet 55 whereby the freezing gas may be admitted to and exhausted from the unit as will be hereinafter more fully described.

It is of course to be understood that the above description of this unit contemplates merely a preferred embodiment of this feature of the invention and various modifications in structure will be obvious to those skilled in the art, the primary idea being the provision of a thin hollow chamber, as distinguished from circulating pipes, into which the refrigerant is adapted to pass and completely fill the same, thus greatly increasing the efficiency. The chamber also is provided with one or more shelves similarly constructed in order to increase the storage area surrounded by active refrigerant and a suitable means of access to the chamber such as the door 53 above described.

Consider now the refrigerating system. There is provided a refrigerant container 60 and compressor pump 61 adapted to be driven by a motor 62, all of standard construction according to size. The compressed refrigerant is allowed to pass outwardly through pipe 63 to a thermostatically controlled reducing valve 64, where it expands into the system by means of a T-connection 65 provided at one part with a non-return check valve 66 and a manually actuated duplex valve 67 and 69. The former controls the admission of refrigerant to the storage chamber 54, while the check valve 66 prevents a return flow of the refrigerating gas from the freezer unit 11 either by evaporation or gravity.

At the opposite side of the control chamber is the return pipe 68 from the freezer unit, and this is provided with a pipe 76 communicating with the storage chamber. If desired a check valve may be inserted at 70 in pipe 76 to prevent a flow of refrigerant to the storage chamber. In certain cases, however, such a flow may be desirable as when the valve 67 is kept closed for a long period during continuous freezing operation. The return pipe 71 returns to the compressor 61 which is provided with temperature control apparatus, all of conventional character including an expanding sylphon 72 which is subjected to pressure-temperature variations in the system and this in turn actuates a switch 73 for closing the circuit through the compressor motor.

In order that this feature of the invention and associated electrical connections may be clearly understood, there is indicated at 74 and 75 main lead wires for supplying current to the motor 62 for operating the compressor pump, as well as the motor 20 for operating the freezer unit 11. A manually actuated switch 77 coacts with contacts 78 and 80 and when this switch is closed the freezer motor 20 will operate. It will also be noted that this closing of the switch 77 shunts the circuit 75 from wire 81 of the automatic control directly through wire 82 to the compressor motor 62, thereby preventing a stopping of the motor 62 whenever the switch 77—78—80 is closed for operating the freezer motor 20.

A suitable audible alarm mechanism is associated with the freezer and is adapted to be actuated when the consistency of the mix reaches a predetermined point. This alarm mechanism preferably comprises a solenoid and coil 83 in the circuit of the motor 20 which causes a closing of the switch 84 under predetermined conditions of load thereby to actuate the bell transformer 85 and sound the alarm 86.

The operation of the device herein described is substantially as follows. Pre-chilled mix is preferably removed from the mix storage compartment 79 and poured in through the funnel 26 at the top of the freezer 11 until the freezer is filled to the desired level, a suitable amount of space being left at the top in order to allow for ample expansion. The switch 77 is then closed, which starts the motor 20 and in turn operates through gears 28, 30, 38 and 40 to rotate the dashers and beaters within the freezing cylinder 22. The closing of this switch 77 does, as previously explained, shunt out the thermostat or pressure control mechanism 72, 73 for the compressor motor 61 whereby there is insured continuous compressor action during the entire freezing period.

As the mix within the freezer 11 gradually increases in consistency, there will be an increased load upon the freezing motor 20 which at the desired moment will actuate the solenoid 83, throw the switch 84, and sound the alarm 86. When this occurs, the operator immediately closes the valve 69 which simultaneously opens the valve 67, these being connected and operated simultaneously in any desired manner. Then the check valve 66 prevents a drainage or evaporation through the storage unit of any refrigerant in the freezer unit 11 while the valve 69 closes off the return pipe 71, thus isolating the freezer unit 11 from the storage unit 10. The valve 67 being open the refrigerant changes its course and flows through the storage chamber walls and out through the outlet 70. The freezing operation in the freezing unit is thus instantly stopped and the partially frozen mix is drawn off from the freezing unit through the gate 42 into a suitable receptacle which is placed within the storage chamber as indicated in Fig. 2. These containers rest on three sides adjacent to hollow walls filled with a refrigerant and thus being surrounded to a large extent by active refrigerant, there is obtained a rapid and efficient transfer of heat from the partially frozen mixture thereby insuring quick hardening of the cream.

It will in many cases be preferable to reverse the above isolation of units and have the freezer unit only in active connection with the condensing means during the freezing period. This may be accomplished by inserting a check valve in pipe 76 as hereinbefore described and is preferable when the freezer is used intermittently. When the freezer is to be operated continuously for a long period of time, then it is preferable to omit said check valve and allow unvaporized refrigerant from the freezer to pass into the storage unit, thus insuring continued refrigeration in the storage unit during extended freezing operation. It may therefore be readily seen that such arrangements permit minimum temperature fluctuation in the storage compartment during freezing periods.

When further ice cream is required, the above operation is repeated, it being only necessary to close the valve 67 and open the valve 69 prior to filling the freezer unit 11 and starting its motor 20.

From the above it will be seen that the present invention contemplates a reliable, efficient and self-contained ice cream apparatus, which may be relatively inexpensively manufactured, installed and operated. The device is substantially foolproof in operation, as well as safe from every angle. The simplicity of construction of the freezer elements particularly permits the device to be kept in a clean and sanitary condition with minimum effort. The invention is believed to accomplish among others all of the objects and advantages herein set forth.

Without further analysis the foregoing will so fully reveal the gist of this invention that others can by applying current knowledge readily adapt it for various applications without omitting certain features that from the standpoint of the prior art, fairly constitute essential characteristics of the generic or specific aspects of this invention, and therefore such adaptations should and are intended to be comprehended within the meaning and range of equivalency of the following claims.

I claim:

1. In apparatus of the character described, in combination, a freezer unit comprising a cylindrical double wall chamber between which walls a fluid refrigerant is adapted to pass for freezing ice cream contained within said unit, a closure fitting within said walls, an agitator within the unit, a motor mounted on the top of said unit and movable with respect thereto, said closure for the unit co-operating with a train of gears associated with the motor and movable therewith for operating the agitator within the freezer unit, said closure for the freezer unit being provided with a filling opening at one side of and separated from said gears.

2. In apparatus of the character described, in combination, a freezer unit adapted to be mounted upon a storage chamber and having insulated walls enclosing a double wall liner between which walls a fluid refrigerant is adapted to expand, a cylindrical closure for the freezer unit, an agitator within the unit having a shaft extending up through the closure, a motor hingedly mounted upon the outer walls of the unit and having a portion adapted to fit within said closure containing a train of gears connected with the motor and having a slip fit with the shaft of said agitator whereby the motor may be swung about said hinged mounting clear of the closure and the closure removed to permit cleaning of the interior of said freezing unit.

3. In apparatus of the character described, in combination, a freezer unit adapted to be mounted upon a storage chamber and having insulated walls enclosing a double wall liner between which walls a fluid refrigerant is adapted to expand, a cylindrical closure for the freezer unit, an agitator within the unit having a shaft extending up through the closure, a motor movably mounted upon the outer walls of the unit and having a portion adapted to fit within said closure containing a train of gears connected with the motor and having a slip fit with the shaft of said agitator whereby the motor may be moved clear of the closure and the closure removed to permit cleaning of the interior of said freezing unit, said closure having a funnel opening at one side thereof and separated from said train of gears.

4. In apparatus of the character described, in combination, a freezer unit adapted to be mounted upon a storage chamber and having insulated walls enclosing a double wall liner between which walls a fluid refrigerant is adapted to expand, a cylindrical closure for the freezer unit, an agitator within the unit having a shaft extending up through the closure, a motor hingedly mounted upon the outer walls of the unit and having a portion adapted to fit within said closure containing a train of gears connected with the motor and having a slip fit with the shaft of said agitator whereby the motor may be swung about said hinged mounting clear of the closure and the closure removed to permit cleaning of the interior of said freezing unit, said unit having a discharge outlet at the lower part thereof.

WILLIAM W. PARKER.